(12) United States Patent
Inazumi

(10) Patent No.: US 7,977,901 B2
(45) Date of Patent: Jul. 12, 2011

(54) ELECTROMECHANICAL MACHINE CONTROL SYSTEM

(75) Inventor: Masanobu Inazumi, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 515 days.

(21) Appl. No.: 12/280,528

(22) PCT Filed: Feb. 6, 2007

(86) PCT No.: PCT/JP2007/051981
§ 371 (c)(1),
(2), (4) Date: Aug. 22, 2008

(87) PCT Pub. No.: WO2007/097183
PCT Pub. Date: Aug. 30, 2007

(65) Prior Publication Data
US 2009/0256516 A1    Oct. 15, 2009

(30) Foreign Application Priority Data

Feb. 24, 2006 (JP) .................................. 2006-048659

(51) Int. Cl.
*H02P 6/08* (2006.01)
(52) U.S. Cl. .......... 318/400.34; 318/400.02; 318/400.05
(58) Field of Classification Search ............. 318/400.01, 318/400.02, 400.05, 400.07, 400.32, 400.34, 318/400.35
See application file for complete search history.

(56) References Cited

U.S. PATENT DOCUMENTS

| | | | | | |
|---|---|---|---|---|---|
| 4,088,935 | A | * | 5/1978 | D'Atre et al. | 318/802 |
| 4,629,961 | A | * | 12/1986 | Blaschke | 318/803 |
| 4,764,711 | A | * | 8/1988 | Deller | 318/619 |
| 6,703,807 | B2 | * | 3/2004 | Sakata et al. | 318/700 |

FOREIGN PATENT DOCUMENTS

| | | |
|---|---|---|
| JP | 8-126400 A | 5/1996 |
| JP | 2002-291272 A | 10/2002 |
| JP | 2003-52198 A | 2/2003 |
| JP | 2003-189687 A | 7/2003 |
| JP | 2003-204694 A | 7/2003 |
| JP | 2005-86869 A | 3/2005 |
| JP | 2005-151610 A | 6/2005 |

* cited by examiner

*Primary Examiner* — Bentsu Ro
(74) *Attorney, Agent, or Firm* — Sughrue Mion, PLLC

(57) ABSTRACT

There is provided an electromechanical machine control system for variable speed controlling an electromechanical machine which can realize a desired control response and a stable control system by online regulating the gain of a linear differential controller by current feedback based on an electric parameter or mechanical parameter of the electromechanical machine. The electromechanical machine control system includes a current coordinate transformer (15) for coordinate transforming a current detection value of the electromechanical machine (13) which is inputted into a γ-axis current having the same phase as a position reference and a δ-axis current which advances 90 degrees further than the position reference, a δ-axis stabilizer (16) for implementing a linear differential control on the δ-axis current which is inputted to output a δ-axis current voltage correction amount and a δ-axis stabilizing gain regulator (17) for regulating the linear differential control gain of the δ-axis stabilizer.

6 Claims, 4 Drawing Sheets

ELECTROMECHANICAL MACHINE CONTROL SYSTEM

TECHNICAL FIELD

The present invention relates to an electromechanical machine control system with no speed sensor or a speed sensor-less electromechanical machine control system for speed controlling an electromechanical machine through a target control response using an inverter circuit.

RELATED ART

Conventionally, as one of speed sensor-less electromechanical machine driving method, there is a V/f control method for controlling an electromagnetic machine by substantially proportioning voltage that is energized to the electromechanical machine to frequency. In the V/f control, a system is proposed in which a voltage outputted to the electromechanical machine is regulated according to a current detected from a stator of the electromechanical machine for the purpose of preventing hunting or saving energy while the electromechanical machine is being driven.

In an electromechanical machine control system, which is a first conventional example, a reactive component current is obtained from an electromechanical machine current and a rotating phase, and an error voltage is obtained from the reactive component current and a reactive component current reference value so as to compensate for a V/f characteristic of the electromechanical machine. (For example, refer to Patent Document No. 1.) In addition, an electromechanical machine control system, which is a second conventional example, includes a current coordinate transformer for coordinate transforming a stator current for two phases into a current component which advances 90 degrees further than a position reference value, a first voltage corrector for generating a voltage correction amount which is proportional to a current outputted from a low-pass filter which passes a current from the current coordinate transformer, and a second voltage corrector for generating a voltage correction amount which is proportional to a current outputted from a high-pass filter which passes a current outputted from the current coordinate transformer, whereby a voltage energized to a synchronous electromechanical machine by a current of a δ-axis component of a control axis. (For example, refer to Patent Document No. 2.)

FIG. 3 is a schematic block diagram of the electromechanical machine control system of the first conventional example. In the figure, 2 denotes an inverter circuit, 4 an electromechanical machine current detection unit, 5 an inverter controller, 6 a frequency setting part, 7 a waveform generation part, 8 a reactive component current operation part, 9 a reactive component current reference part, 10 an error voltage operation part, 11 a V/f transformer part, 12 an output reference operation part, and 31, 32 adder part. In addition, 1 denotes a power supply and 3 an electromechanical machine. In the inverter controller 5, a frequency of an input signal which controls the inverter circuit 2 is set in the frequency setting part 6, and an input signal of the set frequency is outputted to the waveform generation part 7 and the V/f transformer part 11. The waveform generation part 7 generates a rotating phase signal using the output signal from the frequency setting part 6 as an input signal and outputs the rotating phase signal so generated to the reactive component current operation part 8 and the output reference operation part 12. The reactive component current operation unit 8 obtains a reactive component from a detection output of the electromechanical machine current detection unit 4 and an output from the waveform generation part 7 and inputs the reactive component current so obtained to one end of the adder part 31. A reactive component current reference value which is outputted from the reactive component current reference part 9 is inputted to the other end of the adder part 31. An added output of the adder part 31 is inputted into the error voltage operation part 10, so as to obtain an error voltage. An output of the error voltage operation part 10 is added to an output from the V/f transformer part 11 in the adder part 32, and an output resulting from the addition is inputted into the output reference operation part 12. An output of the output reference operation part 12 is inputted into the inverter circuit 2 so as to drive the inverter circuit 2. In addition, assuming that detection signals that are outputted when the electromechanical machine current detection unit 4 detects currents of U phase, V phase and W phase are Iu, Iv, Iw, respectively, the reactive component current operation part 8 performs an operation shown by an expression (1) below to obtain a reactive component current detection value Ir.

[Equation 1]

$$Ir = \sqrt{\frac{2}{3}} \cdot \left\{ Iu \cdot \cos\theta + Iv \cdot \cos\left(\theta - \frac{2}{3}\pi\right) + Iw \cdot \cos\left(\theta - \frac{4}{3}\pi\right) \right\} \quad (1)$$

FIG. 4 is a schematic block diagram of the electromechanical machine control system of the second conventional example. In the figure, 1 denotes an FV transformer, 2 an inverter circuit, 3 a synchronous electromechanical machine, 4 an integrator, 5 a current coordinate transformer, 6, 7 voltage correctors, 8 a low-pass filter, and 9 a high-pass filter. A speed reference ωrm_ref is inputted into the FV transformer 1, and the FV transformer 1 outputs a voltage reference E_ref. In addition, the speed reference ωrm_ref is inputted into the integrator 4 and outputs a position reference θ_ref. On the other hand, armature currents Iu, Iw of the synchronous electromechanical machine 3 are inputted into the current coordinate transformer 5, which outputs a δ-axis current Iδ which is obtained by coordinate transforming the currents into an axis which advances 90 degrees further than the position reference θ_ref. By passing the δ-axis current through the low-pass filter 8, an LPF_out is outputted. The voltage corrector 6 implements a proportional control using the LPF_out as an input, so as to output a voltage correction amount ΔV1. In addition, by passing the δ-axis current through the high-pass filter 9, an HPF_out is outputted. The voltage corrector 7 implements a proportional control using the HPF_out as an input, so as to output a voltage correction amount ΔV2. These voltage correction amounts Δ1 and Δ2 to the voltage reference E_ref, and a voltage reference V_ref after the correction and the position reference θ_ref are inputted into the inverter circuit 2, so as to drive the inverter circuit 2.

Patent Document No. 1: JP-A-2003-204694 (pages 6 to 8, FIG. 2)

Patent Document No. 2: JP-A-2005-151610 (page 3, FIG. 1)

DISCLOSURE OF THE INVENTION

Problems to be Solved by the Invention

In the electromechanical machine control system of the first conventional example, although since the reactive current is regulated, the energy efficiency is improved, since the control response and the stabilization of the control system depend upon inertia and the electric parameter of the electromechanical machine, depending upon electromechanical machines, there has been a problem that the target control response cannot be realized. In addition, in the electromechanical machine of the second conventional example, although the target control response can be realized in the event that the gains of the voltage correctors are manually regulated, since the regulating method is the manual regulation by examining the actual machine, it takes time to implement an optimum regulation, and there has been a risk that the control system is made to oscillate at the regulating stage so as to damage the system.

Note that the fact that the control response and the stabilization of the control system depend upon inertia and the electric parameter of the electromechanical machine will be described later.

The invention is made in view of these problems, and an object thereof is to provide an electromechanical machine control system which can realize a desired control response and a stable control system by online regulating the gain of a linear differential controller by current feedback by the electric parameter or mechanical parameter of an electromechanical machine.

Means for Solving the Problems

With a view to solving the problem, the invention is configured as follows.

According to a first aspect of the invention, there is provided an electromechanical machine control system including:

an FV transformer for outputting an induced electromotive force reference which is proportional to a frequency of a speed reference, an integrator for integrating the speed reference to generate a position reference, an inverter circuit for supplying a driving power based on the position reference to an electromechanical machine, a current coordinate transformer for coordinate transforming a current detection value or the electromechanical machine which is inputted into a γ-axis current having the same phase as the position reference and a δ-axis current having a phase which advances 90 degrees further than the position reference, a δ-axis stabilizer for linearly differentially controlling the δ-axis current which is inputted to output a δ-axis voltage correction amount, and a δ-axis stabilizing gain regulator for regulating a linear differential control gain of the δ-axis stabilizer, wherein a speed of the electromechanical machine is variably controlled on the basis of the induced electromotive force reference and the δ-axis voltage correction amount.

Further, according to a second aspect of the invention, there is provided the electromechanical machine control system as set forth in the first aspect, wherein the δ-axis stabilizing gain regulator regulates the linear differential control gain on the basis of an electric parameter or a mechanical parameter of the electromechanical machine.

Further, according to a third aspect of the invention, there is provided the electromechanical machine control system as set forth in the first aspect, wherein the δ-axis stabilizing gain regulator regulates the linear differential control gain on the basis of an intrinsic oscillation frequency and an attenuation parameter of a control system.

According to a forth aspect of the invention, there is provided an electromechanical machine control system including:

an FV transformer for outputting an induced electromotive force reference which is proportional to a frequency of a speed reference, an integrator for integrating the speed reference to generate a position reference, an inverter circuit for supplying a driving power based on the position reference to an electromechanical machine, a current coordinate transformer for coordinate transforming a current detection value of the electromechanical machine which is inputted into a γ-axis current having the same phase as the position reference and a δ-axis current having a phase which advances 90 degrees further than the position reference, a γ-axis stabilizer for linearly differentially controlling the γ-axis current which is inputted to output a γ-axis voltage correction amount, a δ-axis stabilizer for linearly differentially controlling the δ-axis current which is inputted to output a δ-axis voltage correction amount, a γ-axis stabilizing gain regulator for regulating a linear differential control gain of the γ-axis stabilizer, and a δ-axis stabilizing gain regulator for regulating a linear differential control gain of the δ-axis stabilizer, wherein a speed of the electromechanical machine is variably controlled on the basis of the induced electromotive force reference, the γ-axis voltage correction amount and the δ-axis voltage correction amount.

Further, according to a fifth aspect of the invention, there is provided the electromechanical machine control system as set forth in the forth aspect, wherein the γ-axis stabilizing gain regulator and the δ-axis stabilizing gain regulator regulate the linear differential control gain on the basis of an electric parameter or a mechanical parameter of the electromechanical machine.

Further, according to a sixth aspect of the invention, there is provided the electromechanical machine control system as set forth in the forth aspect, wherein the γ-axis stabilizing gain regulator and the δ-axis stabilizing gain regulator regulate the linear differential control gain on the basis of an intrinsic oscillation frequency and an attenuation parameter of a control system.

ADVANTAGE OF THE INVENTION

According to the invention set forth in claim 1 or 4, a desired control response and a stabilized control system can be realized. In addition, a gain regulation which is not accompanied by a risk that the system fails can be implemented online.

In addition, according to the invention set forth in claim 2 or 5, the known electric parameter and mechanical parameter of the electromechanical machine can be used, thereby making it possible to implement a gain regulation with ease and for a short time period. In addition, in the event that electromechanical machines to be controlled are changed, the known electric parameter and mechanical parameter of a replacement electromechanical machine are used, the change in electromechanical machines can be dealt with, the versatility of the electromechanical machine control system can be increased.

In addition, according to the invention set forth in claim 3 or 6, a gain regulation can be implemented which takes into consideration control response and stabilization of the control system. Additionally, a risk that the system fails at the time of gain regulation can be suppressed.

BRIEF DESCRIPTION OF THE DRAWINGS

FIG. 1 is a schematic block diagram of an electromechanical machine control system according to a first embodiment of the invention.
FIG. 2 is a schematic block diagram of an electromechanical machine control system according to a second embodiment of the invention.
FIG. 3 is a schematic block diagram of an electromechanical machine control system of a first conventional example.
FIG. 4 is a schematic block diagram of an electromechanical machine control system according to a second conventional example.

DESCRIPTION OF REFERENCE NUMERALS

11 TV transformer; 12 inverter circuit; 13 synchronous electromechanical machine; 14 integrator; 15, 21 current coordinate transformer; 16 δ-axis stabilizer; 17 δ-axis stabilizing gain regulator; 18 adder; 22 γ-axis stabilizer; 23 γ-axis stabilizing gain regulator.

BEST MODE FOR CARRYING OUT THE INVENTION

Hereinafter, embodiments of the invention will be described.

Embodiment 1

Firstly, the fact that control response and the stability of a control system depend on inertia and the electric parameter of an electromechanical machine will be described. A transmission function from a speed reference ωref to an actual speed ω is expressed by Expression (2), and from Expression (2) an intrinsic oscillation frequency ωn and an attenuation coefficient ξ of the control system are expressed by Expression (3)

[Equation 2]

$$\omega_{ref} = \frac{\Phi^2 \cdot J}{s^2 \cdot J \cdot L + s \cdot J \cdot R + 3/2 \cdot \Phi^2 \cdot pole^2} \cdot \omega \quad (2)$$

$$\omega n = \Phi \cdot pole \cdot \sqrt{\frac{3}{2 \cdot J \cdot L}}, \quad (3)$$

$$\xi = \frac{R}{2 \cdot \Phi \cdot pole} \cdot \sqrt{\frac{2 \cdot J}{3 \cdot L}}$$

where, Φ denotes a magnetic flux [wb] of an electromechanical machine, R a resistance [Ω] of the electromechanical machine, L an inductance [H] of the electromechanical machine, J an inertia [kg·m²] of the electromechanical machine, and pole the number of polarities of the electromechanical machine.

Consequently, it is seen from Expression (3) that control response and stability vary depending upon a combination of an electric parameter or mechanical parameter of an electromechanical machine.

Figure 1:
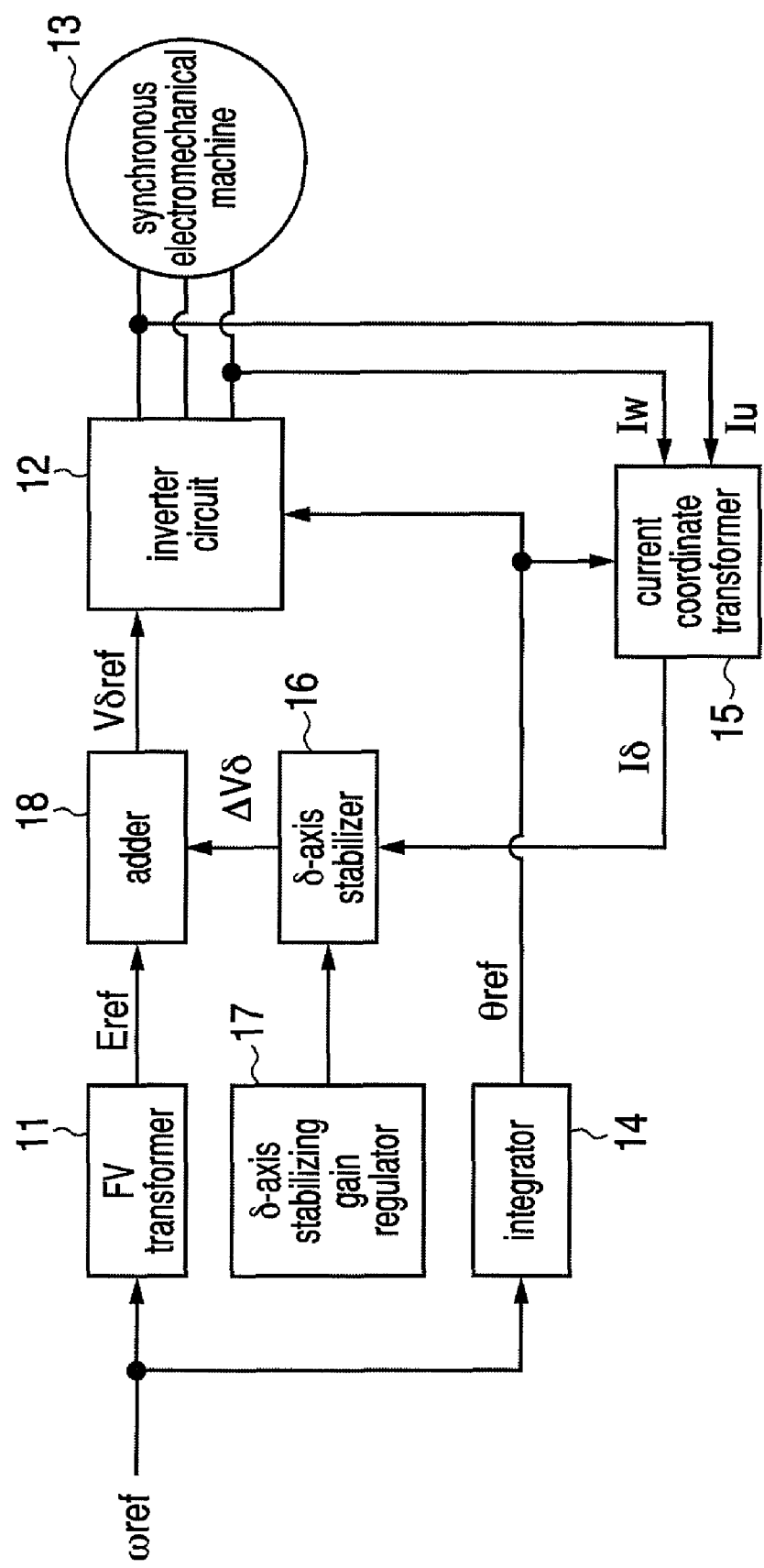
[FIG. 1]
Figure 3:
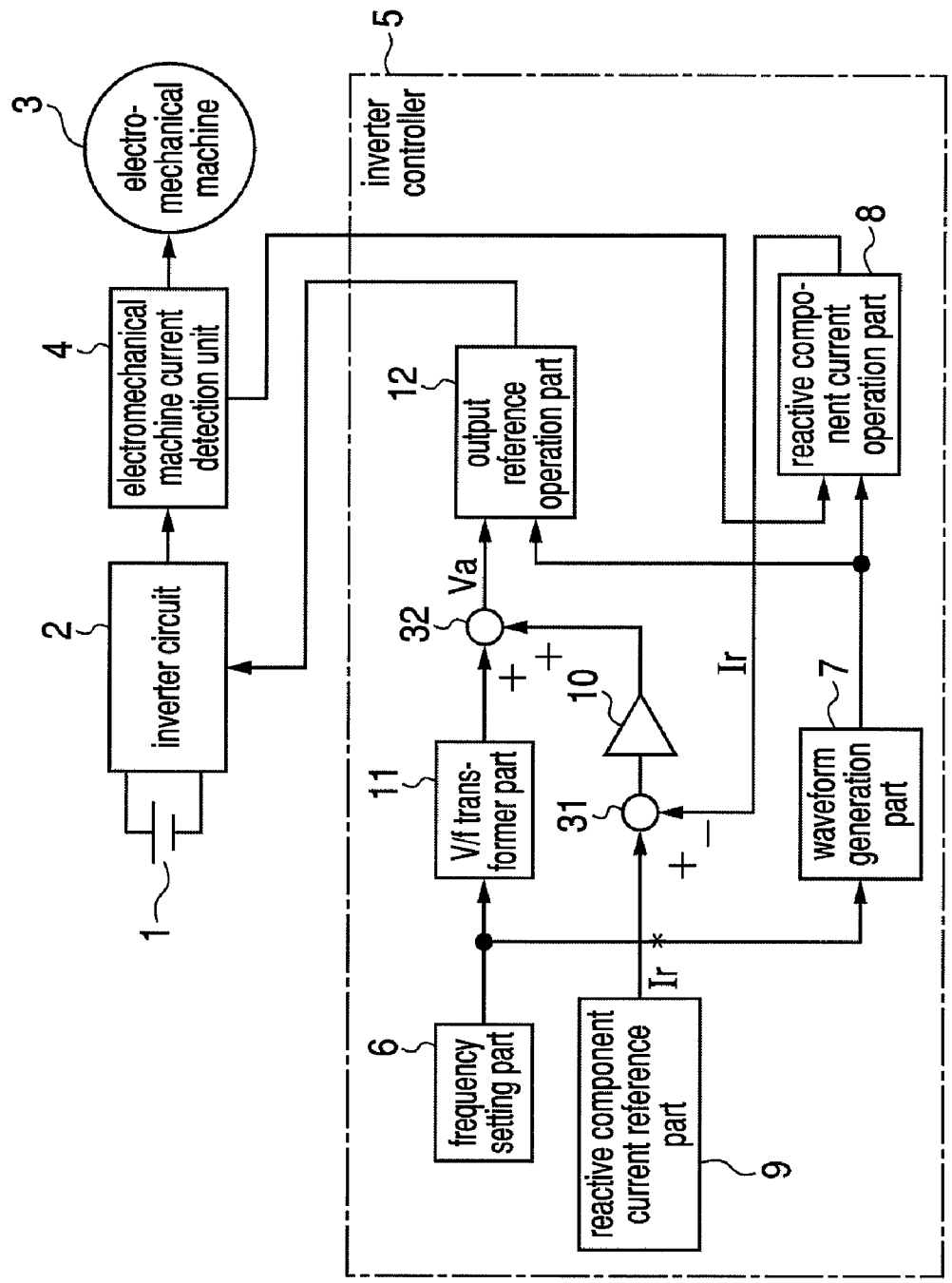
[FIG. 3]

FIG. 1 is a schematic block diagram of an electromechanical machine control system of a first embodiment of the invention. In the figure, 11 denotes an FV transformer, 12 an inverter circuit, 13 a synchronous electromechanical machine, 14 an integrator, 15 a current coordinate transformer, 16 a δ-axis stabilizer, 17 a δ-axis stabilizing gain regulator, and 18 an adder.

Where the invention differs from Patent Document No. 1 is that the invention includes the integrator 14, the current coordinate transformer 15, the δ-axis stabilizer, and the δ-axis stabilizing gain regulator 17 and do not include the reactive component current reference part 9, the waveform generation part 7, the reactive component current operation part 8 and the error voltage operation part 10 which are shown in FIG. 3 of Patent Document No. 1.

Figure 4:
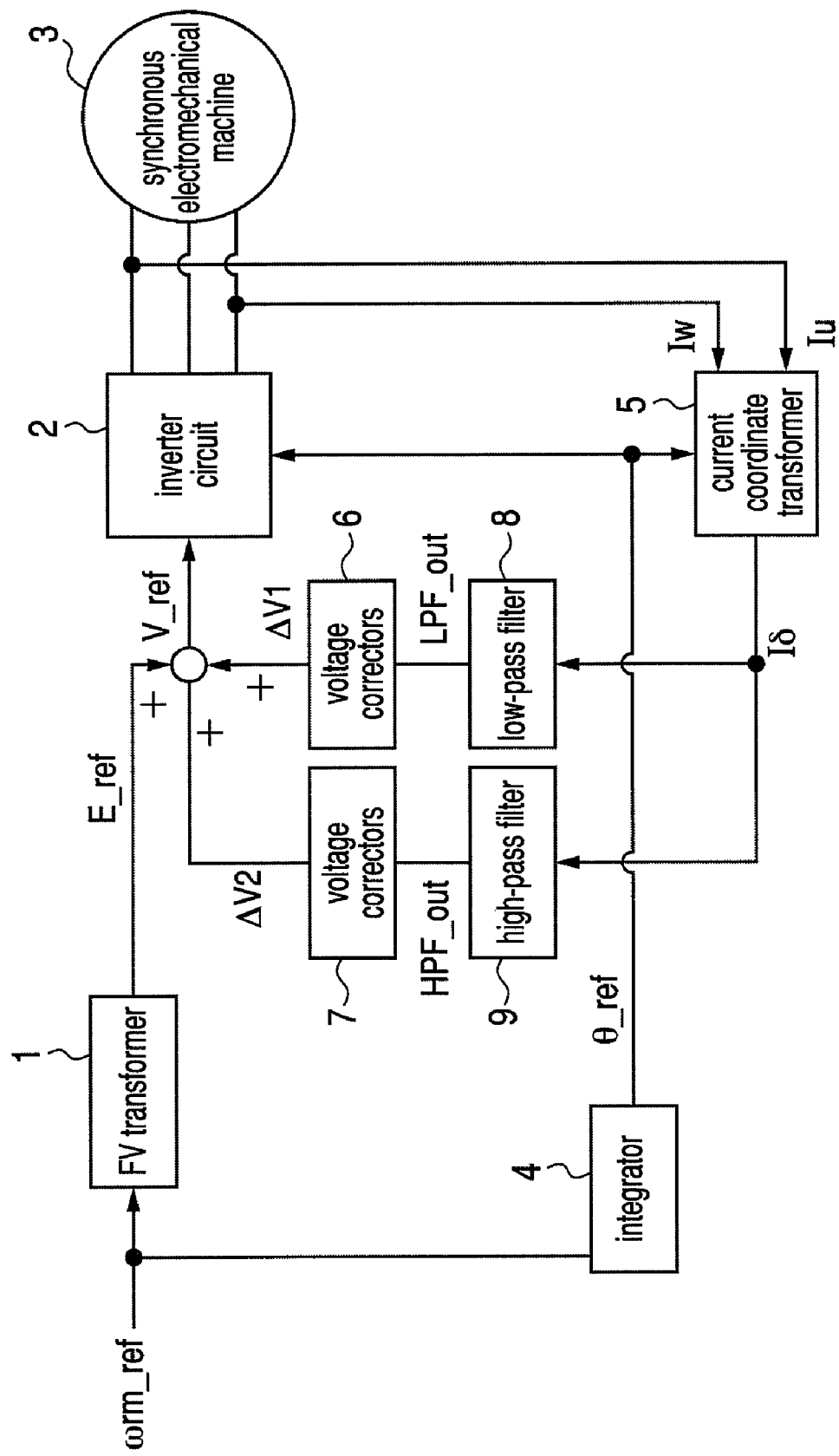
[FIG. 4]

In addition, where the invention differs from Patent Document No. 2 is that the invention includes the δ-axis stabilizer and the δ-axis stabilizing gain regulator 17 and do not include the voltage correctors 6, 7, the low-pass filter 8 and the high-pass filter 9 which are shown in FIG. 4 of Patent Document No. 2.

A speed reference ωref is inputted into the FV transformer 11 and the FV transformer outputs an induced electromotive force reference Eref. In addition, the speed reference ωref is outputted to the integrator 14, which outputs a position reference θref. On the other hand, the δ-axis stabilizer 16 implements a linear differential control using as an input a δ-axis current which is obtained by coordinate transforming armature currents Iu, Iw of the synchronous electromechanical machine into a phase which advances 90 degrees from the position reference θref by the current coordinate transformer 15 and outputs a δ-axis voltage correction amount ΔVδ.

Here, when current is subjected to a linear differential control and an output therefrom is fed back to the voltage reference to regulate control response and stability, a transmission function of the control system is expressed by Expression (4), and an intrinsic oscillation frequency ωn and an attenuation coefficient ξ of the control system are expressed by Expression (5).

[Equation 3]

$$\omega^* = \frac{\Phi^2 \cdot J}{s^2 \cdot J \cdot (L - K2) + s \cdot J \cdot (R - K1) + 3/2 \cdot \Phi^2 \cdot pole^2} \cdot \omega \quad (4)$$

$$\omega n = \Phi \cdot pole \cdot \sqrt{\frac{3}{2 \cdot J \cdot (L - K2)}}, \quad (5)$$

$$\xi = \frac{R - K1}{2 \cdot \Phi \cdot pole} \cdot \sqrt{\frac{2 \cdot J}{3 \cdot (L - K2)}}$$

It is seen from Expression (5) that control response and stability can be regulated by a proportional gain K1 and differential gain K2 of the linear differential control Consequently, letting control response be ωn [rad/sec], for the attenuation coefficient ω to become ω=1, which is a critical attenuation, the proportional gain K1 and the differential gain K2 may be set to Expression (6).

[Equation 4]

$$K1 = R - 2 \cdot \Phi \cdot \text{pole} \cdot \sqrt{\frac{3 \cdot (L - K2)}{2 \cdot J}}, \quad (6)$$

$$K2 = L - \frac{3 \cdot \Phi^2 \cdot \text{pole}^2}{2 \cdot J \cdot \omega n^2}$$

The proportional gain K1 and the differential gain K2 of the δ-axis stabilizer 16 which implements a linear differential control are regulated by the δ-axis stabilizing gain regulator 17 which implements an operational processing of Expression (6). Then, a sum of the induced electromotive force reference Eref which is the output of the FV transformer 11 and the δ-axis voltage correction amount ΔVδ which is the output of the δ-axis stabilizer 16 by the adder 18, and the δ-axis voltage reference Vδref which is the output of the adder 18 and the position reference θref which is the output of the integrator 14 are inputted into the inverter circuit 12, so as to implement an arc striking.

Embodiment 2

Figure 2:
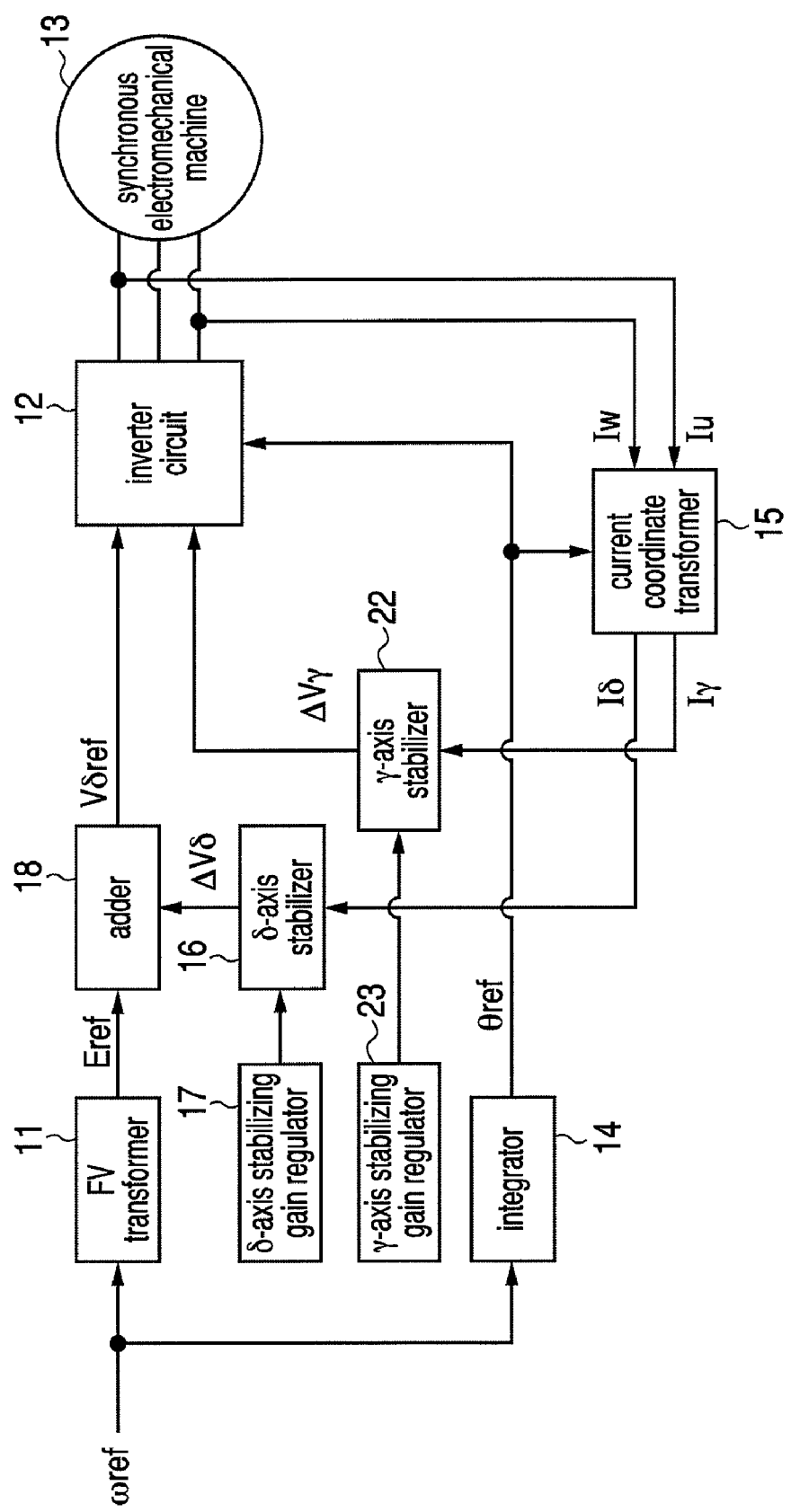
[FIG. 2]

FIG. 2 is a schematic block diagram of an electromechanical machine control system according to a second embodiment of the invention. In the figure, 21 denotes a current coordinate transformer, 22 a γ-axis stabilizer, and 23 a γ-axis stabilizing gain regulator. Note that since constituent components denoted by like reference numerals to those in FIG. 1 of Embodiment 1 provides the same function and advantage as those of Embodiment 1, the description thereof will be omitted.

Where the second embodiment differs from the first embodiment shown in FIG. 1 is that the second embodiment includes the current coordinate transformer 21 for receiving armature currents Iu, Iw of a synchronous electromechanical machine as inputs for output of a γ-axis current Iγ and a δ-axis current Iδ in place of the current coordinate transformer 5 shown in FIG. 1, the γ-axis stabilizer 22 for outputting a γ-axis voltage correction amount using the γ-axis current as an input and the γ-axis stabilizing gain regulator 23 for regulating a control gain of the γ-axis stabilizer.

A speed reference ωref is inputted into the FV transformer 11 and the FV transformer outputs an induced electromotive force reference Eref. In addition, the speed reference ωref is outputted to the integrator 14, which outputs a position reference θref. On the other hand, the γ-axis stabilizer 22 implements a linear differential control using as in input a γ-axis current that is obtained by coordinate transforming armature currents Iu, Iw of the synchronous electromechanical machine into the same phase as the position reference θref by the current coordinate transformer 21 and outputs a γ-axis voltage correction amount ΔVγ. A proportional gain K1γ and a differential gain K2γ of the γ-axis stabilizer 22 are regulated by the γ-axis stabilizing gain regulator 23 which performs the operational processing of Expression (6). Furthermore, an δ-axis stabilizer 16 implements a linear differential control using as an input a δ-axis current which is obtained by coordinate transforming the armature currents Iu, Iw of the synchronous electromechanical machine into a phase which advances 90 degrees from the position reference θref by a current coordinate transformer 15 and outputs a δ-axis voltage correction amount ΔVδ. A proportional gain K1δ and a differential gain K2δ of the δ-axis stabilizer 16 are regulated by a δ-axis stabilizing gain regulator 17 which performs the operational processing of Expression (6). Then, a sum of the induced electromotive force reference Eref which is the output of the FV transformer 11 and the δ-axis voltage correction amount ΔVδ which is the output of the δ-axis stabilizer 16 by the adder 18, and the δ-axis voltage reference Vδref which is the output of the adder 18, the γ-axis voltage correction amount ΔVγ and the position reference θref are inputted into the inverter circuit 12, so as to implement an arc striking.

INDUSTRIAL APPLICABILITY

The electromechanical machine control system of the invention is the electromechanical machine control system for an electromechanical machine which utilizes the speed sensor-less driving method, and since the electromechanical control system can realize the desired control response and the stable control system by speed controlling the electromechanical machine through the target control response using the inverter circuit the electromechanical machine control system can be applied to fields of elevators, cranes, air conditioners and the like for the purpose of preventing hunting and saving energy while it is being driven.

The invention claimed is:

1. An electromechanical machine control system comprising:
    an FV transformer for outputting an induced electromotive force reference which is proportional to a frequency of a speed reference,
    an integrator for integrating the speed reference to generate a position reference,
    an inverter circuit for supplying a driving power based on the position reference to an electromechanical machine,
    a current coordinate transformer for coordinate transforming a current detection value of the electromechanical machine which is inputted into a γ-axis current having the same phase as the position reference and a δ-axis current having a phase which advances 90 degrees further than the position reference,
    a δ-axis stabilizer for linearly differentially controlling the δ-axis current which is inputted to output a δ-axis voltage correction amount, and
    a δ-axis stabilizing gain regulator for regulating a linear differential control gain of the δ-axis stabilizer, wherein
    a speed of the electromechanical machine is variably controlled on the basis of the induced electromotive force reference and the δ-axis voltage correction amount.

2. The electromechanical machine control system as set forth in claim 1, wherein
    the δ-axis stabilizing gain regulator regulates the linear differential control gain on the basis of an electric parameter or a mechanical parameter of the electromechanical machine.

3. The electromechanical machine control system as set forth in claim 1, wherein
    the δ-axis stabilizing gain regulator regulates the linear differential control gain on the basis of an intrinsic oscillation frequency and an attenuation parameter of a control system.

4. An electromechanical machine control system comprising:
    an FV transformer for outputting an induced electromotive force reference which is proportional to a frequency of a speed reference,
    an integrator for integrating the speed reference to generate a position reference,
    an inverter circuit for supplying a driving power based on the position reference to an electromechanical machine, a current coordinate transformer for coordinate transforming a current detection value of the electromechanical machine which is inputted into a γ-axis current having the same phase as the position reference and a δ-axis current having a phase which advances 90 degrees further than the position reference, a γ-axis stabilizer for linearly differentially controlling the γ-axis current which is inputted to output a γ-axis voltage correction amount, a δ-axis stabilizer for linearly differentially controlling the δ-axis current which is inputted to output a δ-axis voltage correction amount, a γ-axis stabilizing gain regulator for regulating a linear differential control gain of the γ-axis stabilizer, and a δ-axis stabilizing gain regulator for regulating a linear differential control gain of the δ-axis stabilizer, wherein a speed of the electromechanical machine is variably controlled on the basis of the induced electromotive force reference, the γ-axis voltage correction amount and the δ-axis voltage correction amount.

5. The electromechanical machine control system as set forth in claim 4, wherein the γ-axis stabilizing gain regulator and the δ-axis stabilizing gain regulator regulate the linear differential control gain on the basis of an electric parameter or a mechanical parameter of the electromechanical machine.

6. The electromechanical machine control system as set forth in claim 4, wherein the γ-axis stabilizing gain regulator and the δ-axis stabilizing gain regulator regulate the linear differential control gain on the basis of an intrinsic oscillation frequency and an attenuation parameter of a control system.

* * * * *